United States Patent [19]

Shimizu et al.

[11] Patent Number: 5,677,356
[45] Date of Patent: Oct. 14, 1997

[54] EXPANDABLE POLY (VINYL CHLORIDE) RESIN COMPOSITION FOR USE IN POWER MOLDING, PROCESS FOR PRODUCING THE SAME, AND EXPANSION-MOLDED ARTICLES USING THE SAME

[75] Inventors: Hikaru Shimizu, Osaka; Toshio Igarashi, Kyoto; Akira Wakatsuki, Niihama; Yoshihiro Nakatsuji, Toyonaka; Yuu Shida, Nagoya, all of Japan

[73] Assignee: Sumitomo Chemical Company, Limited, Osaka, Japan

[21] Appl. No.: 405,778

[22] Filed: Mar. 17, 1995

[30] Foreign Application Priority Data

Mar. 18, 1994 [JP] Japan .................... 6-048982

[51] Int. Cl.$^6$ ................ C08J 9/10; C08L 27/06
[52] U.S. Cl. ............. 521/73; 521/75; 521/107; 521/134; 521/145; 264/41; 264/54
[58] Field of Search ................ 521/107, 145, 521/134, 75, 73; 41/41, 54

[56] References Cited

U.S. PATENT DOCUMENTS

| | | |
|---|---|---|
| 3,880,794 | 4/1975 | Iida et al. . |
| 4,226,443 | 10/1980 | Tsurushige et al. ............ 521/145 |
| 4,434,251 | 2/1984 | Sasajima et al. ............ 521/145 |
| 4,781,976 | 11/1988 | Fujita et al. . |
| 4,956,222 | 9/1990 | Matsuura et al. ............ 521/145 |
| 5,321,090 | 6/1994 | Nakatsuji et al. ............ 521/75 |

FOREIGN PATENT DOCUMENTS

| | | |
|---|---|---|
| 61-111337 | 5/1986 | Japan . |
| 61-285231 | 12/1986 | Japan . |
| 04-337345 | 11/1992 | Japan . |

*Primary Examiner*—John M. Cooney, Jr.
*Attorney, Agent, or Firm*—Birch, Stewart, Kolasch & Birch, LLP

[57] ABSTRACT

An expandable poly(vinyl chloride) resin composition for use in powder molding process containing a granular poly (vinyl chloride) resin, a fine-granular poly(vinyl chloride) resin, a plasticizer, a stabilizer, a foaming agent and an alkyl phosphate gives by a powder molding process an expansion-molded article having remarkably strengthened foamed cells and free from the occurrence of surface unevenness caused by polyurethane backing.

17 Claims, No Drawings

EXPANDABLE POLY (VINYL CHLORIDE) RESIN COMPOSITION FOR USE IN POWER MOLDING, PROCESS FOR PRODUCING THE SAME, AND EXPANSION-MOLDED ARTICLES USING THE SAME

FIELD OF THE INVENTION

The present invention relates to an expandable poly(vinyl chloride) resin composition for use in powder molding, a process for producing said resin composition, and expansion-molded articles using said resin composition.

BACKGROUND OF THE INVENTION

The skin materials used in interior automotive trims such as crush pad, armrest, headrest, console, meter cover, door trim, etc. are required to have a light weight, a soft feeling and a grain leather pattern or a stitch pattern of high-grade sense.

It is well known that these skin materials are produced by dry-blending a vinyl chloride type resin with a plasticizer, a stabilizer and other additives to obtain a powdery composition and thereafter, subjecting the powdery composition to the powder slush molding which comprises contacting the powdery composition with a hot mold to fuse the powder particles each other and removing excessive, unfused powder particles. For example, JP-A-61-111337 proposes a process for producing an expanded molded article by powder-molding an expandable poly(vinyl chloride) resin composition containing a foaming agent; and JP-B-42-11510 proposes a process for producing a double-layered molded article constituted of a non-expanded layer and an expanded layer by fusion-bonding a powdery composition containing no foaming agent on a hot mold, fusion-bonding thereto a powdery composition containing a foaming agent, and then expanding the latter composition at a temperature not lower than the decomposition temperature of the foaming agent.

However, such expansion-molded articles produced by the powder molding process have a problem that the strength of cells of the articles is usually insufficient. For example, when they are backed with a polyurethane and then put to use, the surface thereof is often uneven.

SUMMARY OF THE INVENTION

With the aim of solving the problem mentioned above, the present inventors have conducted extensive studies. As a result, it has been found that the strength of the foamed cells is remarkably improved by incorporating a specified quantity of a specified phosphoric acid ester into the powdery composition. Based on this finding, the present invention has been accomplished.

At the same time, it has also been found that the unevenness of the poly(vinyl chloride)-side surface of the polyurethane-backed articles is caused by the impregnation of the foamed cells with the polyurethane solution and the curing of the polyurethane, and that the unevenness of the surface can be prevented by the improvement of strength of the foamed cells.

Thus, the present invention provides an industrially superior expandable poly(vinyl chloride) resin composition for use in powder molding process which comprises:

(a) a poly(vinyl chloride) resin having an average particle diameter of from 30 μm to 500 μm, (b) a poly(vinyl chloride) resin having an average particle diameter of from 0.1 μm to 10 μm, (c) a plasticizer, (d) a stabilizer, (e) a foaming agent, and (f) an alkyl phosphate containing 1 to 3 alkyl groups each of which has 4 to 9 carbon atoms, wherein the content of the alkyl phosphate (f) falls within the range of from 0.1 to 2 parts by weight per 100 parts by weight of the sum of the poly(vinyl chloride) resin (a) and the poly(vinyl chloride) resin (b);

a process for producing an expandable poly(vinyl chloride) resin composition for use in powder molding process which comprises the step of:

mixing (a) a poly(vinyl chloride) resin having an average particle diameter of from 30 μm to 500 μm, (b) a poly(vinyl chloride) resin having an average particle diameter of from 0.1 μm to 10 μm, (c) a plasticizer, (d) a stabilizer, (e) a forming agent, and (f) an alkyl phosphate containing 1 to 3 alkyl groups each of which has 4 to 9 carbon atoms, wherein the proportion of the alkyl phosphate (f) falls within the range of from 0.1 to 2 parts by weight per 100 parts by weight of the sum of the poly(vinyl chloride) resin (a) and the poly(vinyl chloride) resin (b);

an expansion-molded article produced by powder molding an expandable poly(vinyl chloride) resin composition which comprises:

(a) a poly(vinyl chloride) resin having an average particle diameter of from 30 μm to 500 μm, (b) a poly(vinyl chloride) resin having an average particle diameter of from 0.1 μm to 10 μm, (c) a plasticizer, (d) a stabilizer, (e) a foaming agent, and (f) an alkyl phosphate containing 1 to 3 alkyl groups each of which has 4 to 9 carbon atoms, wherein the content of the alkyl phosphate (f) falls within the range of from 0.1 to 2 parts by weight per 100 parts by weight of the sum of the poly(vinyl chloride) type resin (a) and the poly(vinyl chloride) type resin (b);

use of the composition as mentioned above; and a process for improving the cell strength of a molded article which comprises the step of:

(1) allowing a mixture of (a) a poly(vinyl chloride) resin having an average particle diameter of from 30 μm to 500 μm, (b) a poly(vinyl chloride) resin having an average particle diameter of from 0.1 μm to 10 μm, (c) a plasticizer, (d) a stabilizer, and (e) a forming agent to contain (f) an alkyl phosphate containing 1 to 3 alkyl groups each of which has 4 to 9 carbon atoms, wherein the proportion of the alkyl phosphate (f) falls within the range of from 0.1 to 2 parts by weight per 100 parts by weight of the sum of the poly(vinyl chloride) resin (a) and the poly (vinyl chloride) resin (b) to obtain an expandable poly(vinyl chloride) resin composition, and (2) powder molding the expandable poly(vinyl chloride) resin composition.

DETAILED DESCRIPTION OF THE INVENTION

A poly(vinyl chloride) resin (a) having an average particle diameter of from 30 μm to 500 μm, which is used in the present invention, is hereinafter referred to as "granular resin". The granular resin preferably has an average particle diameter of from 70 to 500 μm, more preferably from 100 to 150 μm. The average particle diameter of the granular resin is a weight average particle diameter determined by the following procedures:

Contaminants and coarse particles in the granular resin are removed by the use of a sieve having a mesh of 850 μm. JIS Z 8801–1987 standard sieves (depth: 25 mm, inner diameter: 200 mm) each having a mesh of 500 μm, 355 μm, 250 μm, 150 μm, 75 μm and 45 μm are stacked in the decreasing order of mesh size. The thus stacked sieves are attached to a Ro-Tap sieve shaking apparatus (manufactured by Iida Seisakusho). Thereafter, 100 g of a sample is charged on the top sieve. After shaking the sieves with the sieve shaking apparatus for 15 minutes, an average particle diameter is determined from the weight of particles in each particle section by the following equation:

(an average particle diameter)=$\Sigma(W \times D)/\Sigma W$ wherein W is the weight of particles which belong to each particle size section and D is the representative particle size of each particle size section as shown in Table 1.

TABLE 1

| Representative particle size of each particle size section | |
|---|---|
| Particle size section (μm) | Representative particle size (μm) |
| 500 μm or more | 675 |
| 355 μm or more and less than 500 μm | 427.5 |
| 250 μm or more and less than 355 μm | 302.5 |
| 150 μm or more and less than 250 μm | 200 |
| 75 μm or more and less than 150 μm | 112.5 |
| 45 μm or more and less than 75 μm | 60 |
| less than 45 μm | 22.5 |

The granular resin preferably has an average polymerization degree of from 400 to 1500, more preferably from 400 to 1300, most preferably 700 to 1100. The granular resin includes homopolymers of vinyl chloride; copolymers of vinyl chloride and monomers copolymerizable therewith such as ethylene, propylene, vinyl acetate, (meth)acrylates and the like; graft copolymers of vinyl chloride on ethylene-vinyl acetate copolymer, etc.; however, is not restricted to those compounds. Mixtures of two or more kinds of these polymers are also usable.

The granular resin is usually produced by suspension polymerization process or bulk polymerization process.

A poly(vinyl chloride) resin (b) having an average particle diameter of from 0.1 μm to 10 μm, which is used in the present invention, is hereinafter referred to as "fine-granular resin". The average particle diameter of the fine-granular resin is a volume average particle diameter determined by the use of an apparatus for measuring particle size distribution, Microtrack-MKII (manufactured by NIKKISO CO., LTD.), to which are applied laser diffraction method and Mei scattering theory.

The fine-granular resin is used for the purpose of covering the above-mentioned granular resin. The fine-granular resin preferably has an average polymerization degree of from 400 to 3600, more preferably from 500 to 2000, most preferably 700 to 1500. The fine-granular resin includes homopolymers of vinyl chloride and copolymers of vinyl chloride and monomers copolymerizable therewith such as ethylene, propylene, vinyl acetate, (meth)acrylates and the like; however, is not restricted to those compounds. Mixtures of two or more kinds of these polymers are also usable for this purpose.

The fine-granular resin is usually produced by emulsion polymerization process or micro-suspension polymerization process.

The mixing ratio of the fine-granular resin to the granular resin in weight basis in the present invention usually ranges from 3:97 to 20:80.

The composition of the present invention contains a specified alkyl phosphate containing 1 to 3 alkyl groups each of which has from 4 to 9 carbon atoms. Examples of said alkyl group having from 4 to 9 carbon atoms include n-butyl, 2-methylpropyl, 1-methylpropyl, n-pentyl, 1-methylbutyl, 2-methylbutyl, 3-methylbutyl, 1-ethylpropyl, n-hexyl, 3,3-dimethylbutyl, 4-methylpentyl, 1-ethylbutyl, n-heptyl, 3-methylhexyl, 2,4-dimethylpentyl, n-octyl, 2-ethylhexyl, n-nonyl, 3,5,5-trimethylhexyl and the like. Of these alkyl groups, the alkyl groups having from 5 to 7 carbon atoms are particularly preferred.

Typical examples of the alkyl phosphate are:

monoalkyl phosphates such as mono-n-butyl phosphate, mono-2-methylpropyl phosphate, mono-n-pentyl phosphate, mono-3-methylbutyl phosphate, mono-n-heptyl phosphate, mono-3-methylhexyl phosphate, mono-2,4-dimethylpentyl phosphate, mono-n-octyl phosphate, mono-n=octyl phosphate, mono-2-ethylhexyl phosphate, mono-n-nonyl phosphate, mono-3,5,5-trimethylhexyl phosphate and the like;

dialkyl phosphates such as di-n-butyl phosphate, di-2-methylpropyl phosphate, di-n-pentyl phosphate, di-3-methylbutyl phosphate, di-n-heptyl phosphate, di-3-methylhexyl phosphate, di-2,4-dimethylpentyl phosphate, di-n-octyl phosphate, di-2-ethylhexyl phosphate, di-n-nonyl phosphate, di-3,5,5-trimethyl hexyl phosphate and the like;

trialkyl phosphates such as tri-n-butyl phosphate, tri-2-methylpropyl phosphate, tri-n-pentyl phosphate, tri-3-methylbutyl phosphate, tri-n-heptyl phosphate, tri-3-methylhexyl phosphate, tri-2,4-dimethylpentyl phosphate, tri-n-octyl phosphate, tri-2-ethylhexyl phosphate, tri-n-nonyl phosphate, tri-3,5,5-trimethylhexyl phosphate and the like;

and the mixtures thereof.

Of these alkyl phosphates, monoalkyl phosphates, dialkyl phosphates and the mixtures thereof are particularly preferred.

The alkyl phosphates are used usually in an amount of from 0.1 to 2 parts by weight, preferably in an amount of from 0.2 to 1.5 parts by weight, and more preferably in an amount of from 0.3 to 1 part by weight, per 100 parts by weight of the sum of the granular resin and the fine-granular resin.

The composition of the present invention may contain a plasticizer, a stabilizer, a foaming agent and optionally other ingredients such as foaming assistant, pigment, filler and the like.

As the plasticizer, there can be used, for example, dialkyl phthalates of which the alkyl group has from 9 to 11 carbon atoms (e.g., diisodecyl phthalate, diisoundecyl phthalate and the like), trialkyl trimellitates of which the alkyl group has from 7 to 11 carbon atoms (e.g., trioctyl trimellitate, tri-2-ethylhexyl trimellitate, tridecyl trimellitate and the like) and the mixtures thereof, etc. However, the plasticizer is not particularly restricted so far as it is usable in a resin composition for powder molding. The plasticizer is used preferably in an amount of from about 30 to about 120 parts by weight per 100 parts by weight of the sum of the granular resin and the fine-granular resin.

As the stabilizer, there can be used, for example, compounds containing one or more metals such as zinc, barium, sodium, potassium, calcium, lithium, tin and the like (e.g., metal salts of a carboxylic acid). Particularly preferably, composite stabilizers made of the compounds containing one or more metals are used. These stabilizers may be used in combination with other stabilizers such as magnesium oxide, magnesium hydroxide, hydrotalcites, zinc oxide, barium oxide, calcium oxide, barium phosphate and the like. The stabilizer also includes antioxidants of phenol type, thioether type, phosphorus type and the like; light stabilizers of diketo compound type, salicylic acid type, benzophenone type, benzotriazole type, hindered amine type and the like; and epoxy compounds, which may also be used in combination with the above-mentioned stabilizers. However, the antioxidants and the light stabilizers, etc. are not particularly restricted, so far as they are usable in resin compositions for powder molding. The stabilizer is used preferably in an amount of about 1 to about 15 parts by weight per 100 parts by weight of the sum of the granular resin and the fine-granular resin.

As the foaming agent, there can be used, for example, thermal decomposition type foaming agents such as azodicarbonamide, p,p'-oxybisbenzenesulfonyl hydrazide, p-toluenesulfonyl hydrazide, benzenesulfonyl hydrazide and the like. If desired, two or more kinds of foaming agents may be used in combination. Among these foaming agents, azodicarbonamide are particularly preferable.

The foaming agent is preferably used in an amount of from about 1 to about 10 parts by weight per 100 parts by weight of the sum of the granular resin and the fine-granular resin.

If necessary, the composition of the invention may contain a foaming assistant in addition to the foaming agent. As the foaming assistant, zinc oxide, inorganic acid salts of zinc such as zinc nitrate and the like, aliphatic acid soaps of zinc such as zinc octanoate, zinc stearate and the like, urea and the like can be used. If desired, two or more of these compounds may be used in combination. The foaming assistant is preferably used in an amount of from about 0.2 to about 3 parts by weight per 100 parts by weight of the sum of the granular resin and the fine-granular resin.

If necessary, the composition of the present invention may contain a cell-uniformalizing agent in addition to the foaming agent. As the cell-uniformalizing agent, for example, acrylic type resins such as methyl (meth)acrylate resin, methyl (meth)acrylate/styrene copolymer resin, methyl (meth)acrylate/butyl (meth)acrylate copolymer resin and the like are preferably used. The cell-uniformalizing agent is preferably used in an amount of from about 0.1 to about 5 parts by weight per 100 parts by weight of the sum of the granular resin and the fine-granular resin.

The expandable poly(vinyl chloride) resin composition for use in powder molding of the present invention can be prepared by mixing the granular resin, fine-granular resin, plasticizer, stabilizer, foaming agent and alkyl phosphate in an optional order. It may be prepared by dry-blending the granular resin with the prescribed ingredients to obtain a precursor mixture and adding the fine-granular resin to the precursor mixture. The alkyl phosphate may be added together with other ingredients during the dry-blending. Alternatively, a mixture of the alkyl phosphate and the fine-granular resin may be added to the precursor mixture obtained by the above-mentioned step of dry-blending.

The temperature at the time of the dry-blending preferably falls within the range of from 60° C. to 130° C. The temperature at which the fine-granular resin is added preferably falls within the approximate range of from 40° C. to 80° C.

In the manner mentioned above, an expandable poly(vinyl chloride) resin composition for use in powder molding of the present invention is obtained. The composition gives an expansion-molded article through a powder molding process, an example of which is the powder slush molding process which comprises contacting the powdery composition with a hot mold to cause a mutual fusion of the powder particles, followed by removing the excessive, unfused powder particles.

The expansion-molded article obtained by subjecting the powdery composition of the present invention to a powder molding process is remarkably improved in the strength of foamed cells. The use of the expansion-molded article of the present invention prevents the occurrence of surface unevenness of the articles obtained therefrom caused by the impregnation of the foamed cells with the polyurethane solution used for backing.

Next, the present invention is illustrated in more detail with reference to the following examples. These examples are not to be construed in any way as limiting the scope of this invention.

EXAMPLE (Preparation of expandable resin composition for use in powder molding)

Into a Supermixer was introduced 90 parts by weight of a granular vinyl chloride resin (manufactured by Sumitomo Chemical Co., Ltd.; prepared by suspension polymerization process; an average particle diameter 120 μm; average degree of polymerization 800). While heating the mixer, the polymer was agitated at a constant rotational speed. When the resin temperature had reached 80° C., 60 parts by weight of a trimellitic ester type plasticizer, 3 parts by weight of a Ba—Zn type stabilizer, 3 parts by weight of azodicarbonamide as a foaming agent, 1 part by weight of zinc oxide as a foaming assistant, 1 part by weight of an acryl type cell-uniformalizing agent (SL-500S; manufactured by Nissan Ferro Organic Chemical Co.), 1 part by weight of a pigment and 0.3 part by weight of a 1:1 mixture of monoalkyl phosphate and dialkyl phosphate of which the alkyl groups were n-butyl (C4AP, manufactured by Nissan Ferro Organic Chemical Co.) were added to the resin, and the resulting mixture was dry-blended.

When temperature of the mixture had reached 120° C., the mixture was cooled to 50° C., and 10 parts by weight of a fine-granular vinyl chloride resin (a polymer prepared by emulsion-polymerization; an average particle diameter 1 μm; average degree of polymerization 1,300) was added to the mixture and uniformly dispersed to obtain an expandable resin composition for use in powder molding process.

(Preparation of expansion-molded article)

The expandable resin composition for use in powder molding process obtained above was sprinkled onto a flat mold having a mirror surface and made of nickel-plated copper which had previously been heated to 220° C. After about 12 seconds had elapsed, the excessive composition was discharged. Subsequently, the composition-carrying mold was heated for 90 seconds in an oven having an atmospheric temperature of 240° C. to cause foaming, after which the mold was taken out of the oven and cooled, and the molded product was demolded to obtain an expanded sheet.

(Evaluation of cell strength)

The expanded sheet obtained above was compressed by means of a press at 80° C., under a pressure of 5 kg/cm² for 5 minutes, and independent foam rate was measured, based on which cell strength was evaluated. The independent foam rate was determined in the following manner. The results are summarized in Table 2 together with the values before the compression.

The sheet was punched out into a shape of disk having a diameter of 32 mm. From thickness and bottom area of this sample, volume V was calculated. On the other hand, volume $V_1$ was determined by means of Autopycnometer Acupyc Model 1320, manufactured by Shimadzu Corp. From the volumes V and $V_1$ thus determined, independent foam rate (X) was calculated according to the following equation:

$$X=[(V_1-W/\rho)/V]\times 100(\%)$$

wherein

V=volume of independent foams+volume of continuous foams+volume of foam walls $V_1$=volume of independent foams+volume of foam walls W=weight of sample $\rho$=true specific gravity of sample (1.15)

Ratings of cell strength:

⊚: independent foam rate is 20% or greater o: independent foam rate is not smaller than 15% and smaller than 20%

×: independent foam rate is smaller than 15%

EXAMPLE 2–3 AND COMPARATIVE EXAMPLES 1–3

The same procedure as in Example 1 was repeated except that the 1:1 mixture of alkyl phosphates of which the alkyl groups were n-butyl was replaced with a 1:1 mixture of monoalkyl phosphate and dialkyl phosphate of which the alkyl groups were n-amyl or isoamyl (C5AP; manufactured by Nissan Ferro Organic Chemical Co.) (Example 2); a 1:1 mixture of monoalkyl phosphate and dialkyl phosphate of which the alkyl groups were 3,5,5-trimethylhexyl (C9AP; manufactured by Nissan Ferro Organic Chemical Co.) (Example 3); a mixture of monoalkyl phosphate and dialkyl phosphate of which the alkyl groups were propyl (Phosphanol 2P; manufactured by Toho Kagaku Kogyo Co.) (Comparative Example 1); or 1:1 mixture of monoalkyl phosphate and dialkyl phosphate of which the alkyl groups were tetramethylnonyl (C13AP; manufactured by Nissan Ferro Organic Chemical Co.) (Comparative Example 2). Further, in yet another experiment, Example 1 was repeated except that no alkyl phosphate was used (Comparative Example 3). The results are summarized in Table 2.

EXAMPLE 4

The same procedure as in Example 1 was repeated except that the mixture of alkyl phosphates of which the alkyl groups were n-butyl was replaced with a 1:1 mixture of monoalkyl phosphate and dialkyl phosphate of which the alkyl groups were n-amyl or isoamyl (C5AP; manufactured by Nissan Ferro Organic Chemical Co.) and the cell-uniformalizing agent SL-500S was replaced with 1 part by weight of BAP-4 (manufactured by Asahi Denka Kogyo). The results are shown in Table 2.

TABLE 2

| Example No. | Carbon number of alkyl group in the alkyl phosphates | Independent foam rate (%) Before compression | Independent foam rate (%) After compression | Cell strength |
|---|---|---|---|---|
| Example 1 | 4 | 38 | 27 | ⊚ |
| Example 2 | 5 | 38 | 28 | ⊚ |
| Example 3 | 9 | 30 | 22 | ⊚ |
| Example 4 | 5 | 32 | 21 | ⊚ |
| Comparative Example 1 | 3 | 38 | 11 | × |
| Comparative Example 2 | 13 | 28 | 2 | × |
| Comparative Example 3 | — | 38 | 7 | × |

EXAMPLES 5–AND COMPARATIVE EXAMPLES 4–6

The same procedure as in Example 1 was repeated except that the mixture of alkyl phosphates of which the alkyl groups were n-butyl was replaced with a monoalkyl phosphate of which the alkyl group was n-amyl or isoamyl (Example 5), 2-ethylhexyl phosphate (Example 6), 3,5,5-trimethylhexyl phosphate (Example 7), tetramethylnonyl phosphate (Comparative Example 4) (C5AP-1, CSAP-1, C9AP-1 or C13AP-1, respectively; manufactured by Nissan Ferro Co.), triethyl phosphate (Comparative Example 5), n-butyl phosphate (Example 8) (TEP or TBP, respectively; manufactured by Kurokane Kasei Co.), or tricresyl phosphate (Comparative Example 6) (manufactured by Daihachi Kasei Co.). The results are shown in Table 3.

TABLE 3

| Example No. | Number of alkyl groups in the alkyl phosphate | Carbon number of alkyl group in the alkyl phosphate | Independent cell rate (%) Before compression | Independent cell rate (%) After compression | Cell strength |
|---|---|---|---|---|---|
| Example 5 | 1 | 5 | 43 | 30 | ⊚ |
| Example 6 | 1 | 8 | 36 | 18 | o |
| Example 7 | 1 | 9 | 32 | 22 | ⊚ |
| Example 8 | 3 | 4 | 40 | 19 | o |
| Comparative Example 4 | 1 | 13 | 30 | 1 | × |
| Comparative Example 5 | 3 | 2 | 38 | 13 | × |
| Comparative Example 6 | 3 | (7)* | 40 | 13 | × |

*Cresyl group

EXAMPLES 9–12 AND COMPARATIVE EXAMPLES 7–8

The same procedure as in Examples 1 was repeated except that no cell-uniformalizing agent was used and the mixture of monoalkyl phosphate and dialkyl phosphate of which the alkyl groups were n-butyl was replaced with each of alkyl phosphate(s) having a prescribed number of alkyl groups and carbon number of alkyl group shown in Table 4. The results are shown in Table 4.

TABLE 4

| Example No. | Number of alkyl groups in the alkyl phosphates | Carbon number of alkyl group in the alkyl phosphates | Independent cell rate (%) | | Cell strength |
|---|---|---|---|---|---|
| | | | Before compression | After compression | |
| Example 9 | 1 | 4 | 28 | 19 | ○ |
| Example 10 | 1 | 5 | 37 | 30 | ⊚ |
| Example 11 | Mixture of 1 and 2 | 4 | 23 | 19 | ⊚ |
| Example 12 | Mixture of 1 and 2 | 5 | 30 | 28 | ⊚ |
| Comparative Example 7 | 1 | 13 | 15 | 9 | x |
| Comparative Example 8 | Mixture of 1 and 2 | 13 | 14 | 9 | x |

EXAMPLES 13–16 AND COMPARATIVE EXAMPLE 9

The same procedure as in Example 1 was repeated except that the amount of the mixture of monoalkyl phosphate and dialkyl phosphate was varied. The results are shown in Table 5.

TABLE 5

| Example No. | Amount of mixture of monoalkyl phosphate and dialkyl phosphate (parts by weight) | Independent foam rate (%) | | Cell strength |
|---|---|---|---|---|
| | | Before compression | After compression | |
| Example 13 | 0.2 | 40 | 15 | ○ |
| Example 14 | 0.5 | 37 | 29 | ⊚ |
| Example 15 | 1.0 | 29 | 25 | ⊚ |
| Example 16 | 1.5 | 32 | 16 | ○ |
| Comparative Example 9 | 3.0 | 15 | 9 | x |

What is claimed is:

1. An expandable poly(vinyl chloride) resin composition for use in powder molding process which comprises:
   (a) a poly(vinyl chloride) resin having an average particle diameter of from 30 μm to 500 μm,
   (b) a poly(vinyl chloride) resin having an average particle diameter of from 0.1 μm to 10 μm,
   (c) a plasticizer,
   (d) a stabilizer,
   (e) a foaming agent, and
   (f) an alkyl phosphate containing 1 to 3 alkyl groups each of which has 4 to 9 carbon atoms,
      wherein the content of the alkyl phosphate (f) falls within the range of from 0.1 to 2 parts by weight per 100 parts by weight of the sum of the poly(vinyl chloride) resin (a) and the poly(vinyl chloride) resin (b).

2. The composition of claim 1, wherein the poly(vinyl chloride) resin (a) is a homopolymer of vinyl chloride and the poly(vinyl chloride) resin (b) is the same or different homopolymer of vinyl chloride.

3. The composition of claim 1, wherein the weight ratio of the poly(vinyl chloride) resin (b) to the poly(vinyl chloride) resin (a) falls within the range of from 3:97 to 20:80.

4. The composition of claim 1, wherein the alkyl phosphate (f) has an alkyl group having from 5 to 7 carbon atoms.

5. The composition of claim 1, wherein the content of the alkyl phosphate (f) falls within the range of from 0.2 to 1.5 parts by weight per 100 parts by weight of the sum of the poly(vinyl chloride) resin (a) and the poly(vinyl chloride) resin (b).

6. The composition of claim 1, wherein the plasticizer is at least one member selected from the group consisting of: diisodecyl phthalate, diisoundecyl phthalate, trioctyl trimellitate, tri-2-ethylhexyl trimellitate, and tridecyl trimellitate.

7. The composition of claim 1, wherein the stabilizer is a member selected from the group consisting of:
   compounds containing at least one metal selected from the group consisting of zinc, barium, sodium, potassium, calcium, lithium and tin, and composite stabilizers made of said compounds containing at least one metal,
   and it optionally includes at least one member selected from the group consisting of:
   magnesium oxide, magnesium hydroxide, hydrotalcites, zinc oxide, barium oxide, calcium oxide, barium phosphate, phenol antioxidants, thioether antioxidants, phosphorous antioxidants, diketo compound light stabilizers, salicylic acid light stabilizers, benzophenone light stabilizers, benzotriazole light stabilizers, benzotriazole light stabilizers, hindered amine light stabilizers and epoxy compounds.

8. The composition of claim 1, wherein the foaming agent is at least one member selected from the group consisting of: azodicarbonamide, p,p',-oxybisbenzenesulfonyl hydrazide, p-toluenesulfonyl hydrazide, and benzenesulfonyl hydrazide.

9. The composition of claim 1, wherein the alkyl phosphate is at least one member selected from the group consisting of: mono-n-butyl phosphate, mono-2-methylpropyl phosphate, mono-n-pentyl phosphate, mono-3-methylbutyl phosphate, mono-n-heptyl phosphate, mono-3-methylhexyl phosphate, mono-2,4-dimethylpentyl phosphate, mono-n-octyl phosphate, mono-2-ethylhexyl phosphate, mono-n-nonyl phosphate, mono-3,5,5-trimethylhexyl phosphate, di-n-butyl phosphate, di-2-methylpropyl phosphate, di-n-pentyl phosphate, di-3-methylbutyl phosphate, di-n-heptyl phosphate, di-3-methylhexyl phosphate, di-2,4-dimethylpentyl phosphate, di-n-octyl phosphate, di-2-ethylhexyl phosphate, di-n-nonyl phosphate, di-3,5,5-trimethyhexyl phosphate, tri-n-butyl phosphate, tri-2-methylpropyl phosphate, tri-n-pentyl phosphate, tri-3-methylbutyl phosphate, tri-n-heptyl phosphate, tri-3-methylhexyl phosphate, tri-2,4-dimethylpentyl phosphate, tri-n-octyl phosphate, tri-2-ethylhexyl phosphate, tri-n-nonyl phosphate, and tri-3,5,5-trimethylhexyl phosphate.

10. The composition of claim 1, wherein the alkyl phosphate is at least one member selected from the group consisting of a monoalkyl phosphate and a dialkyl phosphate.

11. A process for producing an expandable poly(vinyl chloride) resin composition for use in powder molding process which comprises the step of:

mixing (a) a poly(vinyl chloride) resin having an average particle diameter of from 30 μm to 500 μm,
(b) a poly(vinyl chloride) resin having an average particle diameter of from 0.1 μm to 10 μm,
(c) a plasticizer,
(d) a stabilizer,
(e) a foaming agent, and
(f) an alkyl phosphate containing 1 to 3 alkyl groups each of which has 4 to 9 carbon atoms,
wherein the proportion of the alkyl phosphate (f) falls within the range of from 0.1 to 2 parts by weight per 100 parts by weight of the sum of the poly(vinyl chloride) resin (a) and the poly(vinyl chloride) resin (b).

12. The process of claim 11, wherein the mixing step includes the steps of:
(1) dry-blending the poly(vinyl chloride) resin (a), the plasticizer (c), the stabilizer (d), the foaming agent (e), and the alkyl phosphate (f) to obtain a precursor mixture, and
(2) adding the poly(vinyl chloride) resin (b) to the precursor mixture.

13. An expansion-molded article produced by powder molding an expandable poly(vinyl chloride) resin composition which comprises:
(a) a poly(vinyl chloride) resin having an average particle diameter of from 30 μm to 500 μm,
(b) a poly(vinyl chloride) resin having an average particle diameter of from 0.1 μm to 10 μm,
(c) a plasticizer,
(d) a stabilizer,
(e) a foaming agent, and
(f) an alkyl phosphate containing 1 to 3 alkyl groups each of which has 4 to 9 carbon atoms,
wherein the content of the alkyl phosphate (f) falls within the range of from 0.1 to 2 parts by weight per 100 parts by weight of the sum of the poly(vinyl chloride) type resin (a) and the poly(vinyl chloride) type resin (b).

14. A process for improving the cell strength of a molded article which comprises the steps of:
(1) mixing:
(a) a poly(vinyl chloride) resin having an average particle diameter of from 30 μm to 500 μm,
(b) a poly(vinyl chloride) resin having an average particle diameter of from 0.1 μm to 10 μm,
(c) a plasticizer,
(d) a stabilizer,
(e) a foaming agent and
(f) an alkyl phosphate containing 1 to 3 alkyl groups each of which has 4 to 9 carbon atoms, wherein the proportion of the alkyl phosphate (f) falls within the range of from 0.1 to 2 parts by weight per 100 parts by weight of the sum of the poly(vinyl chloride) resin (a) and the poly (vinyl chloride) resin (b) to obtain an expandable poly(vinyl chloride) resin composition, and
(2) powder molding the expandable poly(vinyl chloride) resin composition.

15. The composition of claim 1, wherein the poly(vinyl chloride) resin (a) has an average particle diameter of from 70 μm to 500 μm.

16. The composition of claim 1, wherein the poly(vinyl chloride) resin (a) has an average particle diameter of from 100 μm to 150 μm.

17. The composition of claim 1, wherein the content of the alkyl phosphate (f) falls within the range of from 0.3 to 1 parts by weight per 100 parts by weight of the sum of the poly(vinyl chloride) resin (a) and the poly(vinyl chloride) resin (b).

* * * * *